United States Patent

Izumitani et al.

[15] 3,661,600

[45] May 9, 1972

[54] OPTICAL GLASS WITH A HIGH REFRACTIVE INDEX AND A HIGH DISPERSING ABILITY

[72] Inventors: Tetsuro Izumitani; Kazuo Namiki, both of Tokyo, Japan

[73] Assignee: Hoya Glass Works, Limited, Tokyo, Japan

[22] Filed: Nov. 3, 1969

[21] Appl. No.: 873,678

[30] Foreign Application Priority Data

Nov. 20, 1968 Japan....................................43/85118

[52] U.S. Cl..............................................106/47 Q, 106/47 R
[51] Int. Cl. ......................C03c 3/00, C03c 3/12, C03c 3/30
[58] Field of Search........................................106/47 Q, 47 R

[56] References Cited

UNITED STATES PATENTS 3,291,620  12/1966  Eustropjeu et al........................106/47

FOREIGN PATENTS OR APPLICATIONS 736,073  8/1955  Great Britain............................106/47

*Primary Examiner*—Tobias E. Levow
*Assistant Examiner*—M. Bell
*Attorney*—Cushman, Darby & Cushman

[57] ABSTRACT

A $TeO_2$-$WO_3$ glass with a high refractive index $\eta d$ of not lower than 2.0 and a high dispersing ability represented by Abbe's number of 21 or less, and having a greatly improved stability with respect to both devitrification and chemical durability, can be obtained by the inclusion, in the composition of the glass, of $Li_2O$ and at least one other oxide selected from the group consisting of $K_2O$, $MgO$, $BaO$, $ZnO$, $CdO$, $TiO_2$, $PbO$, $La_2O_3$, $B_2O_3$, $Nb_2O_5$ and $Bi_2O_3$.

2 Claims, No Drawings

OPTICAL GLASS WITH A HIGH REFRACTIVE INDEX AND A HIGH DISPERSING ABILITY

The present invention concerns an optical glass and, more particularly, it relates to the glass having a high refractive index $\eta d$ of not lower than 2.0, a high dispersing ability $\nu d$, of not greater than 21 as expressed by Abbe's number, a high chemical durability and low liquidus temperature.

In order to obtain an optical glass having a high refractive index and a high dispersing ability, there has been known the use of $TeO_2$ as a glass-forming oxide and also known the process for producing an optical glass by the use of this oxide, as disclosed in Japanese Pat. No. 19837/67. However, the conventional tellurite glass which contains BaO and other components had a tendency to devitrify, and this represented poor stability of the melt.

It is, therefore, an object of the present invention to provide an optical glass having a high refractive index and a high dispersing ability.

Another object of the present invention is to provide an optical glass which does not tend to devitrify.

Still another object of the present invention is to provide an optical glass having an improved water-resistance.

Conventional $TeO_2$-$WO_3$ glass containing BaO and other components tended to devitrify when melted. We have unexpectedly discovered that the devitrifying tendency of $TeO_2$-$WO_3$ glass is greatly alleviated by the addition of $Li_2O$. Thus, even the most stable $TeO_2$-$WO_3$-BaO glass among the tellurite system has a liquidus temperature higher than that of the $TeO_2$-$WO_3$-$Li_2O$ glass obtained by the addition of $Li_2O$ according to the present invention. As will be noted from the following Table 1, a conventional glass sample indicated by Number 1, which is the most stable one among the $TeO_2$-$WO_3$-BaO glasses, showed a liquidus temperature as high as 595° C., while the three glass samples Nos. 2, 3 and 4 prepared according to the present invention showed markedly low liquidus temperatures and were so stable that no crystal formation was observed when the melts were held at various temperatures for thirty minutes, and the last sample showed an even lower liquidus temperature of 405° C.

TABLE 1

(each component is expressed by mol percent)

| Sample No. | $TeO_2$ | $WO_3$ | BaO | $Li_2O$ | Liquidus Temp. (°C) |
|---|---|---|---|---|---|
| 1 | 75.0 | 20.0 | 5.0 | – | 595 |
| 2 | 55.0 | 20.0 | – | 25.0 | not-devitrified |
| 3 | 50.0 | 25.0 | – | 25.0 | not-devitrified |
| 4 | 55.0 | 25.0 | – | 20.0 | 405 |

Ternary $TeO_2$-$WO_3$-$Li_2O$ glasses are very poor in its resistance to water. However, the addition thereto of an oxide selected from the group consisting of $K_2O$, MgO, BaO, ZnO, CdO, $TiO_2$, PbO, $La_2O_3$, $B_2O_3$, $Nb_2O_5$, and $Bi_2O_3$ to the glass results in a great improvement of the resistance of the glass to water without interfering with the stability of the glass with respect to devitrification, as shown in Table 2.

TABLE 2

| Sample Number | $TeO_2$ | $WO_3$ | $Li_2O$ | Additive | Water-resistance (weight loss percent) | Liquidus temperature (° C.) |
|---|---|---|---|---|---|---|
| 1 | 55.0 | 25.0 | 20.0 | ---- | 1.04 | 405 |
| 2 | 55.0 | 25.0 | 16.0 | $K_2O$, 4.0 | 0.52 | 388 |
| 3 | 55.0 | 25.0 | 15.0 | $B_2O$, 5.0 | 0.42 | 492 |
| 4 | 55.0 | 25.0 | 18.0 | MgO, 2.0 | 0.74 | 356 |
| 5 | 55.0 | 25.0 | 13.0 | ZnO, 7.0 | 0.03 | 476 |
| 6 | 55.0 | 25.0 | 18.0 | CdO, 2.0 | 0.50 | 403 |
| 7 | 55.0 | 25.0 | 16.0 | $TiO_2$, 4.0 | 0.70 | 476 |
| 8 | 55.0 | 25.0 | 16.0 | PbO, 4.0 | 0.25 | 430 |
| 9 | 55.0 | 25.0 | 16.0 | $La_2O_3$, 4.0 | 0.24 | 417 |
| 10 | 55.0 | 25.0 | 16.0 | $B_2O_3$, 4.0 | 0.55 | 403 |
| 11 | 55.0 | 25.0 | 16.0 | $Nb_2O_5$, 4.0 | 0.46 | 540 |
| 12 | 55.0 | 25.0 | 14.0 | $Bi_2O_3$, 6.0 | 0.05 | (¹) |

¹ Not devitrified.

NOTES:
1. Water-resistance was determined as follows:

An amount equivalent to the specific gravity of particulate glass having a particle size of 28–35 mesh was placed in 150 cc of hot water held at 100° C. and it was left therein for one hour. After this treatment, the glass was dried and weighed to obtain the loss of the weight. The water-resistance was determined by the percent of the lost weight which was calculated in accordance with the following equation:

Water-resistance (percent)

$$= \frac{\text{Initial weight (gr.)} - \text{Weight after treatment (gr.)}}{\text{Initial weight (gr.)}} \times 100$$

2. The proportions of components are expressed in percent by mol.

As a result, according to the present invention there is provided the optical glass which has a high chemical stability and a low liquidus temperature. Furthermore, the optical glass has a high refractive index $\eta d$ of not lower than 2.0 and a low Abbe's number $\nu d$ of not more than 21 as shown in the examples given later in this specification.

The typical glass according to the present invention has a composition, as calculated from the batch on the oxide basis, consisting essentially of: a basic glass which comprises, in mol percent, 50–65% $TeO_2$, 20–30% $WO_3$, 10 – 22% $Li_2O$; and at least one additive which is an oxide selected from the group consisting of 2 – 10% $K_2O$, 1 – 4% MgO, 1 – 6% BaO, 1 – 8% ZnO, 1 – 5% CdO, 1.5 – 6% $TiO_2$, 0.5 – 10% PbO, 0.5 – 5% $La_2O_3$, 1 – 6% $B_2O_3$, 1 – 6% $Nb_2O_5$, and 2 – 8% $Bi_2O_3$.

The reasons for these restrictions of the components are as follows. A batch of glass having the composition consisting of: the basic glass whose components are such that the range of $TeO_2$ content is out of 50 – 65 percent, the range of $WO_3$ content is out of 20 – 30 percent and the range of $Li_2O$ content is smaller than 10 percent; and the additive selected from the aforesaid group but the range of whose content being such that the content of $K_2O$ is greater than 10 percent, and/or the content of MgO is greater than 4 percent, and/or the content of BaO is greater than 6 percent, and/or the content of ZnO is greater than 8 percent, and/or the content of CdO is greater than 5 percent, and/or the content of $TiO_2$ is greater than 6 percent, and/or the content of PbO is greater than 10 percent, and/or the content of $La_2O_3$ is greater than 5 percent, and/or the content of $B_2O_3$ is greater than 6 percent, and/or the content of $Nb_2O_5$ is greater than 6 percent, and/or the content of $Bi_2O_3$ is greater than 8 percent, will undesirably shown a considerably high liquidus temperature resulting in a markedly increased tendency to devitrify. On the other hand, if the batch of glass whose composition is such that the content of $Li_2O$ is greater than 22 percent with respect to the basic glass, and if the additive selected from the aforesaid group but range of those content is such that the content of $K_2O$ is smaller than 2 percent and/or the content of MgO is smaller than 1 percent, and/or the content of BaO is smaller than 1 percent, and/or content of ZnO is smaller than 1 percent, and/or the content of CdO is smaller than 1 percent, and/or the content of $TiO_2$ is smaller than 1.5 percent, and/or the content of PbO is smaller than 0.5 percent, and/or the content of $La_2O_3$ is smaller than 0.5 percent, and/or the content of $B_2O_3$ is smaller than 1 percent, and/or the content of $Nb_2O_5$ is smaller than 1 percent, and/or the content of $Bi_2O_3$ is smaller than 2 percent, such a glass is undesirably shows a markedly poor water-resistance.

Some of the examples of the present invention will be given in the following Table 3.

Each glass-forming batch containing a mixture of components having the proportions, on the oxide basis, as shown in the following Table 3 was melted in a gold crucible of an electric furnace at a temperature of 800° – 900° C. while stirring with a gold rod. After degassing and homogenizing the melt, the temperature of the melt was lowered to about 500° C. Whereupon, the melt was poured into a mold made of cast iron, followed by annealing and subsequent cooling of the same to room temperature. The resulting glass was determined as to its refractive index and dispersing ability. The results are shown in Table 3.

TABLE 3

| Sample Number | $TeO_2$ | $WO_3$ | $Li_2O$ | $K_2O$ | MgO | BaO | $B_2O_3$ | PbO | ZnO | CdO | $La_2O_3$ | $Nb_2O_3$ | $Bi_2O_3$ | $TiO_2$ | $n_d$ | $\mu_d$ |
|---|---|---|---|---|---|---|---|---|---|---|---|---|---|---|---|---|
| 1 | 55.0 | 25.0 | 16.0 | 4.0 | | | | | | | | | | | 2.04016 | 18.78 |
| 2 | 55.0 | 25.0 | 12.0 | 8.0 | | | | | | | | | | | 2.01600 | 19.15 |
| 3 | 55.0 | 25.0 | 18.0 | | 2.0 | | | | | | | | | | 2.06854 | 18.82 |
| 4 | 55.0 | 25.0 | 18.0 | | | 2.0 | | | | | | | | | 2.06963 | 18.86 |
| 5 | 55.0 | 25.0 | 15.0 | | | 5.0 | | | | | | | | | 2.07021 | 18.93 |
| 6 | 50.0 | 28.0 | 20.0 | | | 2.0 | | | | | | | | | 2.05513 | 19.25 |
| 7 | 60.0 | 23.0 | 15.0 | | | 5.0 | | | | | | | | | 2.09061 | 18.41 |
| 8 | 55.0 | 25.0 | 16.0 | | | | 4.0 | | | | | | | | 2.07701 | 18.69 |
| 9 | 55.0 | 25.0 | 16.0 | | | | | 4.0 | | | | | | | 2.08184 | 18.51 |
| 10 | 55.0 | 25.0 | 14.0 | | | | | 6.0 | | | | | | | 2.07452 | 18.76 |
| 11 | 55.0 | 25.0 | 17.0 | | | | | | 3.0 | | | | | | 2.06704 | 18.69 |
| 12 | 55.0 | 25.0 | 13.0 | | | | | | 7.0 | | | | | | 2.05192 | 18.51 |
| 13 | 55.0 | 25.0 | 18.0 | | | | | | | 2.0 | | | | | 2.07432 | 18.76 |
| 14 | 55.0 | 25.0 | 16.0 | | | | | | | 4.0 | | | | | 2.06597 | 19.80 |
| 15 | 55.0 | 25.0 | 14.0 | | | | | | | 6.0 | | | | | 2.05197 | 20.74 |
| 16 | 55.0 | 25.0 | 16.0 | | | | | | | | 4.0 | | | | 2.12394 | 17.53 |
| 17 | 55.0 | 25.0 | 16.0 | | | | | | | | | 4.0 | | | 2.11463 | 17.62 |
| 18 | 55.0 | 25.0 | 14.0 | | | | | | | | | 6.0 | | | 2.14098 | 17.07 |
| 19 | 55.0 | 25.0 | 18.0 | | | | | | | | | | 2.0 | | 2.08826 | 18.09 |
| 20 | 55.0 | 25.0 | 16.0 | | | | | | | | | | 4.0 | | 2.10353 | 17.61 |
| 21 | 55.0 | 25.0 | 14.0 | | | | | | | | | | 6.0 | | 2.12178 | 17.11 |
| 22 | 55.0 | 24.0 | 18.0 | | 2.0 | | | | | | | | | 1.0 | 2.07192 | 18.68 |
| 23 | 55.0 | 23.0 | 18.0 | | 2.0 | | | | | | | | | 3.0 | 2.07453 | 18.54 |
| 24 | 55.0 | 20.0 | 18.0 | | 2.0 | | | | | | | | | 5.0 | 2.07789 | 18.14 |
| 25 | 55.0 | 23.0 | 18.0 | | 2.0 | | | | | | | | | | 2.05820 | 18.75 |

As clearly seen from the results shown in the above Table, the glasses according to the present invention have specific optical constants such as refractive index $\eta d$ as high as 2.0 – 2.2 and Abbe's number as low as 17 – 21, a great stability with respect to devitrification and a high chemical durability. Furthermore, the glasses of the present invention are suitable for production on commercial basis.

We claim:

1. An optical glass having a refractive index $\eta d$ of not smaller than 2.0 and an Abbe's Number of not greater than 21 consisting essentially, by mol, as calculated from the batch on the oxide basis, of a basic glass prepared with the components 50 – 65% $TeO_2$, 20 – 30% $WO_3$ and 10 – 22% $Li_2O$, and an additive consisting of at least one oxide selected from the group consisting of 2 – 10% $K_2O$, 1 – 4% MgO, 1 – 6% BaO, 1 – 8% ZnO, 1 – 5% CdO, 1.5 – 6% $TiO_2O$, 0.5 – 10% PbO, 0.5 – 5% $La_2O_3$, 1 – 6% $B_2O_3$, 1 – 6% $Nb_2O_5$ and 2 – 8% $Bi_2O_3$.

2. A method for improving an optical glass having a refractive index $\eta d$ of not smaller than 2.0 and an Abbe's number of not greater than 21 composed mainly, on the oxide basis by mol, of 50–65% $TeO_2$ and 20–30% $WO_3$ with respect to devitrification and chemical durability, comprising the inclusion of 10–22% $Li_2O$ in said glass to markedly reduce the devitrifying tendency of the glass, and inclusion in said glass of at least one oxide selected from the group consisting, on the oxide basis by mol, of 2–10% $K_2O$, 1–4% MgO, 1–6% BaO, 1–8% ZnO, 1–5% CdO, 1.5–6% $TiO_2$, 0.5–10% PbO, 0.5–5% $La_2O_3$, 1–6 $B_2O_3$, 1–6% $Nb_2O_5$ and 2–8% $Bi_2O_3$ to markedly improve the chemical durability of said glass.

* * * * *